United States Patent

[11] 3,603,093

| [72] | Inventors | William C. Isley<br>Hyattsville;<br>William C. Lund, New Carrollton, both of, Md. |
|---|---|---|
| [21] | Appl. No. | 17,101 |
| [22] | Filed | Mar. 6, 1970 |
| [45] | Patented | Sept. 7, 1971 |
| [73] | Assignee | The United States of America as represented by the Administrator of the National Aeronautics and Space Administration |

[54] HEATED POROUS PLUG MICROTHRUSTOR
5 Claims, 4 Drawing Figs.

[52] U.S. Cl. .................................................. 60/260,
23/281, 23/288
[51] Int. Cl. ..................................................... F02k 9/02
[50] Field of Search ............................................ 60/260,
266, 264, 203, 257, 258, 39.46; 102/49.8; 251/11;
138/45; 23/288, 281

[56] References Cited
UNITED STATES PATENTS

| 2,749,934 | 6/1956 | Nester ......................... | 251/11 X |
| 3,013,388 | 12/1961 | Loughran ..................... | 60/39.46 |
| 3,029,602 | 4/1962 | Allen ............................ | 60/260 X |
| 3,514,953 | 6/1970 | Kephart ........................ | 60/39.46 X |
| 3,188,799 | 6/1965 | Flynn ........................... | 60/203 |

Primary Examiner—Mark M. Newman
Assistant Examiner—R. B. Rothman
Attorneys—R. F. Kempf, N. B. Siegel and G. T. McCoy ABSTRACT: The invention relates to porous plug application in spacecraft reaction jet controlled systems. Typical uses include pressure regulation and flow control, enhancement of propellant disassociation and augmentation of heat transfer rays of propellants. For heated applications, operating temperature of the porous plug can be achieved using a resistance element, or, alternatively, a radio isotope source in the form of a porous plug, for purposes of controlling mass flow rate of propellant and improving specific impulse. Also, the porous plug, in the heated embodiment may incorporate a high-heat capacity media for improving thermal storage properties. For unheated applications, the porous plug is utilized to provide both a stable passive liquid-vapor interface and a means for effecting contaminated insensitive pressure reduction device. Typical applications of the porous plug system are in station keeping and attitude control reaction jet systems for earth satellites.

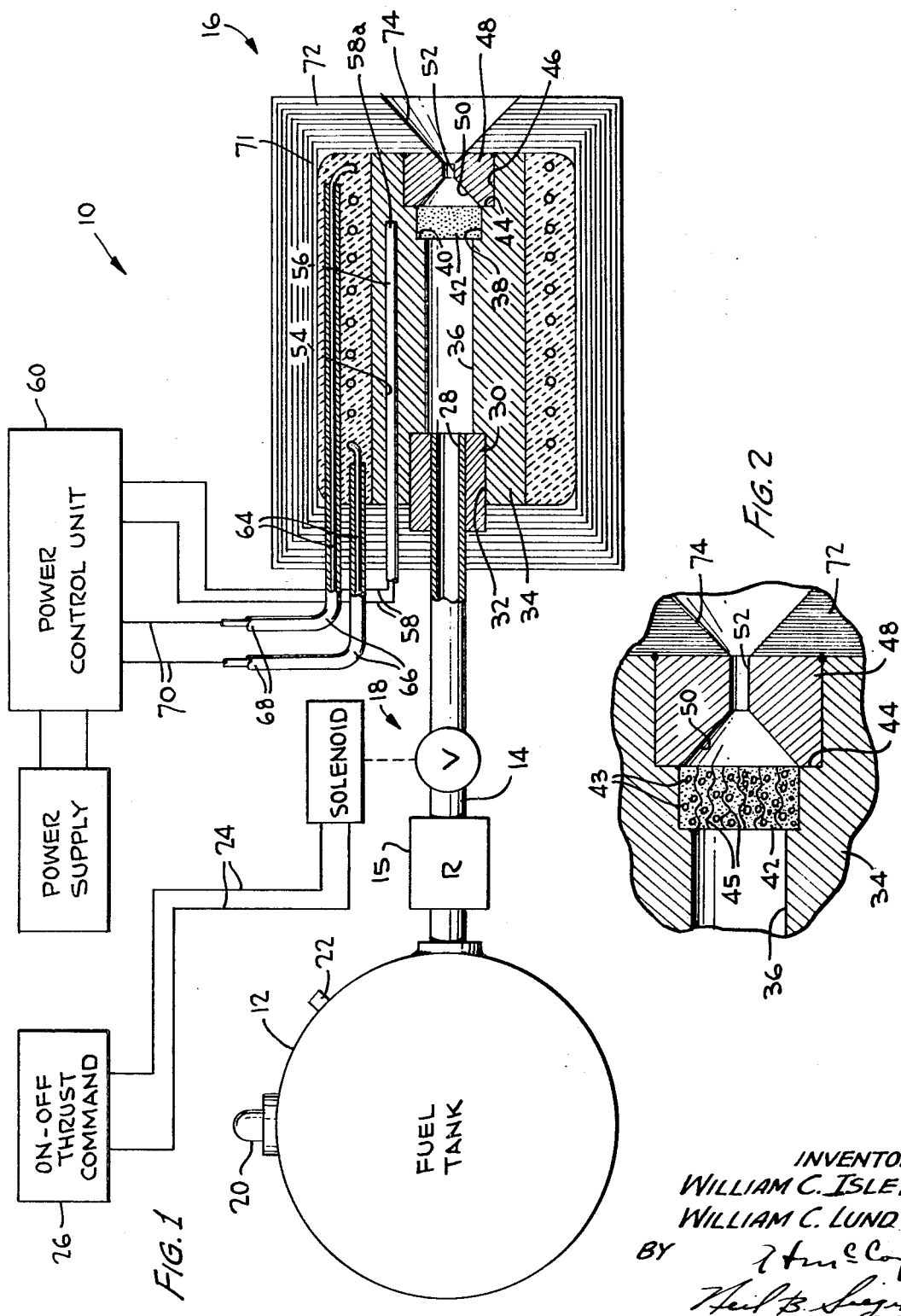

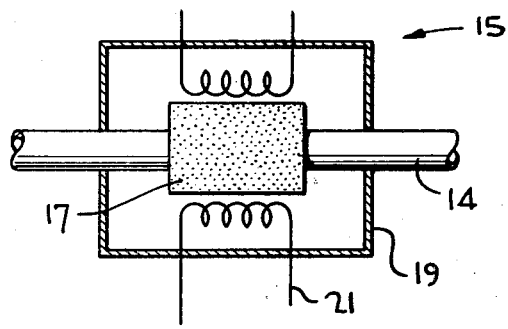
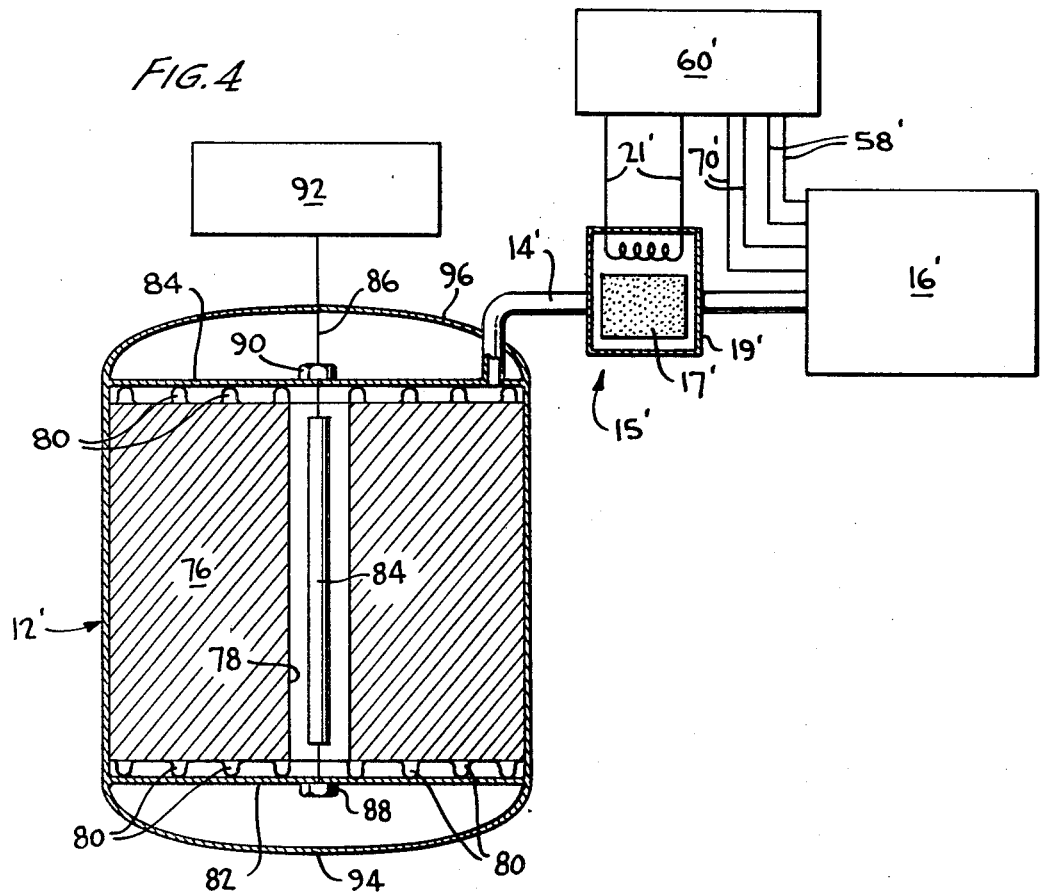

HEATED POROUS PLUG MICROTHRUSTOR

The invention described herein was made by employees of the United States Government and may be manufactured or used by or for the United States Government for Governmental purposes without the payment of any royalties thereon or therefor.

FIELD OF THE INVENTION

The present invention relates to a micropound thrustor utilizing a porous plug to regulate fuel flow, enhance heat transfer to the propellant, to isolate the thrustor reaction chamber at a low pressure level and to maintain a liquid-vapor interface between the propellant fuel tank and the reaction chamber.

BACKGROUND OF THE PRIOR ART

Heretofore, a porous carbonaceous substance has been utilized for a heated porous plug, as described in the patent to Ehrenfeld et al. U.S. Pat. No. 3,358,452. Such a heated porous plug of the prior art operated as a propellant heater and a filter for the thrustor reaction chamber. However, a carbonaceous substance is characterized by a relatively low-thermal expansion coefficient over the range of anticipated thrustor operating temperatures. Thus, such a plug cannot regulate propellant flow by varying plug pore sizes with applied temperatures. Further, the porous plug according to the prior art is suitable only for use with a solid propellant which sublimes and diffuses through the plug upon the application of heat. Further, the prior art plug does not provide catalytic properties capable of disassociating propellants preferable for spacecraft applications. Additionally, at low temperature operations, the heat capacity of carbon does not permit optimization of heat transfer to the propellant, thus limiting the obtainable specific impulse, particularly during long thrust-on periods.

BRIEF SUMMARY OF THE INVENTION

The five embodiments o this invention are used for the improvement of specific impulse of ammonia or hydrazine propellants, and utilized a heated nickel-salt alloy, microporous plug material. Additionally a thermal storage structure may be utilized in direct contact with the plug which will increase the total heat available to the propellant during extended thrust-on operation. According to at least one preferred embodiment, the plug is indirectly heated by a resistance heater or directly heated by a radioisotope source. In another embodiment, the porous plug itself may be fabricated from a radioisotope source. The nickel base microporous plug material is especially suitable for excellent catalytic activity with many propellants, such as ammonia and hydrazine. Another embodiment of the porous plug system is used to provide a liquid-vapor interface to enable pressure regulation and flow rate control of the propellant. The porous plug material in this embodiment must be selected to possess either a relatively large coefficient of thermal expansion or a selected isotope over narrow operating temperature ranges near ambient. Here, the porosity of the plug and its dimensions are functions of the required pressure drop and mass flow rate. A further feature of the invention, when used in conjunction with propellants that are solids at ambient temperatures, is the ability of the microporous plug material to serve as a shut-off valve. Heat is applied to the microporous plug vaporizing the solid propellant. The vapor is allowed to escape at controlled rates to establish the desired thrust. When the heat is shut off the propellant within the pores of the plug rapidly solidifies to terminate thrust. Upon reestablishing the operating temperature, the solidified propellant quickly vaporizes to immediately produce a desired thrust. The thrust is then continued as additional propellant vaporizes through the pores of the heated plug.

The particular microporous plug according to the invention may be utilized with liquid or gaseous propellants, a feature not available with prior art devices. Particularly with liquid propellants, the plug establishes a passive liquid-vapor interface assuring that only vapor is expanded through the thrustor nozzle. Additionally, the porous plug according to the invention provides particulate filtering which prevents clogging of the thrustor nozzle.

Accordingly, it is an object of the present invention to provide a microporous plug providing a liquid-vapor interface between a propellant supply and a thrustor nozzle.

A further object of the invention is to provide a microporous plug establishing low mass propellant flow at a flow rate dependent upon temperature of the plug.

A further object of the invention is to provide a microporous plug of a material possessing catalytic properties sufficient to disassociate a propellant, and further possessing a high heat capacity for storing thermal energy and transferring the same to the propellant.

Another object of the invention is to provide a microporous plug system containing one or more individual porous plug elements which accomplishes all of the above functions while requiring only temperature control of the plugs as required.

Other objects and many attendant advantages of the present invention will become readily apparent upon perusal o the following detailed description taken in conjunction with the accompanying drawings.

BRIEF DESCRIPTION OF THE DRAWINGS

FIG. 1 is a schematic representation of a first embodiment of a thrustor system utilizing liquid or gaseous fuel and a microporous plug providing a liquid-vapor interface between the propellant and a thrustor nozzle.

FIG. 2 is a detailed cross section of a thrustor body utilizing a radioisotope source and a microporous plug according to the invention.

FIG. 3 is a modified embodiment of FIG. 1, and further illustrating a regulator in the form of a porous plug.

FIG. 4 is a schematic representation of yet another embodiment of the present invention utilizing a porous plug or, alternatively, a series of porous plug, for flow regulation between the propellant storage container and the thrustor nozzle.

DETAILED DESCRIPTION OF THE PREFERRED EMBODIMENTS

With more particular reference to the drawings, there is particularly illustrated in FIG. 1, a micropound thrustor system according to the present invention, which system is generally indicated at 10. A generally spherical propellant tank 12, containing a gaseous or liquid fuel such as ammonia or hydrazine, for example, is operably connected by a propellant feed line 14 to a thrustor body 16. Inserted in the propellant feed line 14 is a solenoid operated on-off valve 18 and a regulator shown at 15. The propellant fuel tank may be provided with a propellant filling valve 20 and a pressure sensor 22 for monitoring the internal pressure of the tank. Connected to the solenoid operated valve 18 are a pair of electrical leads 24 operably originating from an on-off thrust command unit indicated at 26. The terminal extended end 28 of the propellant feed line 14 is fusibly embedded within a surrounding metal collar 30. In turn, the collar 30 is embedded within an enlarged recess 32 provided in one end of an elongated thrustor body housing 34. The enlarged recess 32 generally of cylindrical configuration is coaxial with a reduced diameter elongated thrustor body cavity 36. The other end of the housing 34 is provided with a first, stepped enlarged diameter recess 38 providing an annular shoulder 40 surrounding and defining the terminal end of the chamber 36. Rigidly received in the annular recess 38 is a microporous plug 42 of a particular construction and function to be described in detail. The plug 42 completely encompasses the entire geometry of the recess 38, which recess terminates in a surrounding annular shoulder 44. The annular shoulder 44 is itself defined by a second, stepped enlarged diameter recess 46 which receives an enlarged diameter nozzle 48. The nozzle 48 is provided with a convergent section 50 defining a tapered orifice, the enlarged diameter of which is immediately adjacent to the plug 42. The convergent section 50 terminates in a reduced diameter nozzle opening 52, which defines an orifice extending entirely through the orifice plate and in axial alignment with the thrustor body cavity 36. Upon insertion of the nozzle 48 in the recess 46, the plug 42 will be retained rigidly within its provided recess 38. The housing 34 is provided with an elongated bore 54 extending generally parallel to the longitudinal axis of the cavity 26 and the recess 38. The bore 54 purposely terminates short of the recess 46 containing the orifice plug 48.

Embedded within the bore 54 is an elongated tube of aluminum oxide ($Al_2O_3$) which tube 56 is closed at its end 58a within the bottom portion of the bore 54. A pair of thermocouple leads 58 of chromel/alumel extend along the entire length of the tube 56 and thus within the entire length of the bore 54. The leads 58 are operatively connected to a power control unit illustrated schematically at 60. The housing 34 is specifically surrounded by a heater element comprised of heater wire, coiled helically with a plurality of turns 62 in encompassing relationship along the longitudinal axis of the housing 34. The terminal end portions of the wire illustrated at 64 are contained within aluminum oxide tubing lengths 66. The end portion 68 of the tubing lengths receive electrical leads 70 which operatively connect the wire end portions 64 to the power control unit 60. The housing 34 is further surrounded by a ceramic foam heat insulation material 71, applied by flame spraying, for example, along its entire axial dimension. As shown in the drawings, the plurality of turns 62 of the wire are fixedly embedded in the ceramic foam insulation, together with portions of the tubing 66. The end portions 68 of the tubing 66 protrude from the ceramic foam insulation material and encase the end portions 64 of wire, which also protrude from the foam insulation. To further heat insulate the heater element, the thrustor housing 34 is further completely encased within an outer shell 72 of insulation. For example, the shell 72 may be fabricated from a plurality of layers of metal foil, each of said layers being separated by a thin film of insulation material. Accordingly, the outer shell 72 entirely heat insulates the thrustor housing 34 and provides, together with the ceramic foam insulation, a thermal shield surrounding and containing the heater element. As shown in the FIGURE, an outwardly flaring opening 74 is provided in the shell 72, which opening is in communication with and coaxially with the nozzle opening 52 of the orifice plate 48.

In exemplarily practice of the preferred embodiment, the propellant tank 12 may be fabricated by spin-foaming two hemispheres of 4 inch I.D. 6061 alloy welded together by heliarc techniques. For example, the tank capacity may be 270 g. of ammonia at 150 p.s.i.a. operating temperature. The weight of the tank may vary from 77.5 g. to 82.3 g. The pressure control regulator 15 provides the small mass flow rate necessary to enable the porous plug 42 to act as a flow restriction device, as hereinafter described in detail. For example, the regulator is capable of maintaining 1–4 atmospheres outlet pressure within plus or minus 3 percent and is fully compatible with ammonia at an inlet temperature in the range of 90–150 p.s.i.a. The solenoid valve 18 may typically comprise a normally closed valve which is opened at 28 V. DC continuous duty signal received from the on-off thrust command 26. The thrustor body housing 34 may be fabricated from a wide variety of metals to match particular use requirements. The orifice plate 48 is separately machined with a 16 mil opening. Together, the ceramic foam insulation 71 and the outer shell insulation 72 provides heat isolation efficiency over the required temperature range originating from the heater element.

Initially, power is supplied to the control unit 60 from a source (not shown). The power is then transferred via the leads 70 for activating the heater element. The coils 62 of the heater element thus elevate the temperature of the ammonia within the cavity 36 and also elevates the temperature of the porous plug 42. When thrust is desired from the thrustor body 16, a signal from the on-off command 26 opens the solenoid valve 18, permitting ammonia from the fuel tank 12 to be supplied at a mass flow rate predetermined by the regulator 15. The ammonia thus flows in the propellant feed line 14, through the solenoid valve 18, through the collar 30 and into the cavity 36 of the housing 34. As the ammonia passes through pores of the plug 42 it disassociates into hydrogen and nitrogen due to temperature, contact time, and surface catalytic effects of the plug. Further, the plug provides the means for pressure regulation consisted with milipound or micropound thrust levels.

Ammonia vapor thus exhausts through the nozzle opening 52 of the orifice plate and provides a micropound range thrust. By precise control of the porous plug temperature, which is monitored by thermocouple leads 58, the plug acts as a flow restriction device, thereby effectively controlling the amount of thrust obtainable. Disassociation of the ammonia is accomplished by its resident time within the heated cavity 36 and/or as a result of catalysis reaction with the surface of the porous plug material, which material is specifically selected for such catalysis reaction compatible with the particular propellant utilized. Such catalysis reaction permits improved specific impulse at a lower temperature range, since it induces propellant disassociation. Of course, other liquid or gaseous fuels may be utilized, such as hydrogen, for example. In which case the porous plug may be manufactured from a substance compatible with the utilized fuel to provide the desired catalysis. The porous plug structure according to the invention is a separate internal component of the thrustor body 16 permitting selection and assembly of the best catalyst material. Additionally, the porous plug acts as a mechanical filter immediately upstream from the nozzle opening 52, permitting extremely small nozzle sizes without the danger of plugging by impurities.

To extinguish the thrust when desired, an appropriate signal is provided by the on-off thrust command 26 to close the solenoid valve 18 further preventing ammonia propellant flow to the thrustor body 16.

In another embodiment of the present invention, reference will now be made to FIG. 2 of the drawings. In the Figure, a modified thrustor body 16a is illustrated. In this case the plug material is fabricated using a radioisotope material which acts as a direct heat source, thereby obviating the need for an electric heater element. The plug is made up of a number of closely packed cells 43 containing a radio active material. A block of such cells 42 is etched by allowing acid to flow through the block, thereby creating flow passages 45 around the radio active cells 43. The plug then becomes porous with such flow passages. Propellant traversing through the passages is heated by contact with the cells 43.

As a further feature of the invention, reference will now be made to FIG. 3. As shown in the Figure, the regulator 15 may comprise a porous plug which acts, not only as a liquid-vapor interface, but also as a flow regulator device. The feed line 14 has interpose therein a porous plug 17 encased within a housing 19. A heater element 21 extends through the housing 19 and is adjacent to the porous plug 17. Alternatively, the heater element 21 may encircle the plug 17. By proper adjustment of the heat input to the heater element 21, and thus the temperature of the porous plug 17, the mass flow rate of propellant may be accurately controlled. For example, the heater element 21 may be operatively connected to the power control unit 60, to control the temperature of the plug maintained or varied within a desired range, thereby resulting in a corresponding range of propellant flow rates as required to accomplish various thrust demands. Thus the porous plugs according to the invention can accomplish a plurality of functions requiring only passive control with the exception of electric power needed to drive heater element. Further, by specifically choosing the porous plug material with a high heat capacity characteristic, the porous plug will store heat energy which can be transferred rapidly to the propellant during thrustor operation and thus significantly increase the average specific impulse for a given operating temperature of the plug. It is used as a regulator also eliminates the need for a separate shutoff valve 18. Accordingly, the use of a porous plug as a regulator 15 operates both as a regulator and a shutoff valve without any moving part. Further, the regulation of propellant for a reaction jet system, in a spacecraft application, requires regulation of feed system pressure to match the propellant storage, such as liquid ammonia storage, to the thrustor chamber pressure requirement. Conventional regulation methods are generally unreliable due to the presence of moving parts, critical dimensional tolerances and susceptibility to contamination fouling. Accordingly, the use of the porous plug as a regulator operates without such drawbacks of conventional regulation systems.

A further embodiment of the present invention is illustrated in FIG. 4. In the figure parts similar to those in embodiments illustrated in FIGS. 1-3 will be similarly numbered but with prime designation. Accordingly, a propellant fuel tank 12' is connected through a propellant feed line 14' through a regulator 15' to a thrustor body 16'. The regulator 15' is provided with a porous plug 17' enclosed within a outer housing 19'. The plug 17' is heated by a heating element 21' operatively connected to a power control unit 60'. Additionally, the thrustor body 16' is provided with thermocouple leads 70' and heater element control leads 58'. The device of FIG. 4 particularly utilizes a subliming solid propellant 76 of cylindrical configuration and provided with a central cylindrical opening 78 and projecting feet 80, which feet space the propellant 76 from the end walls 82 and 84 of the fuel tank 12'. Axially within and substantially the entire length of the opening 78 is a Calrod type heater 84 suspended within the tank by a guy wire 86 fixedly secured to anchor members 88 and 90 on the tank end walls 82 and 84. In over the guy wire 86 may additional serve as an electrical lead line connecting the Calrod heater 84 operatively to a power control unit 92. The fuel tank 12' may be additionally provided with generally convex additional end walls 94 and 96 increasing the volume of the tank for purposes to be described hereinafter.

In operation, the power control unit 60' furnishes electrical power over the heating element 21', thereby elevating the temperature of the porous plug 17' to a temperature at which sublimation of propellant 76 takes place. Additionally, power is supplied from the power control unit 92, over the electrical 86 to the Calrod heater 84. The Calrod heater 84 transfers heat energy to the surface of the propellant 76 within the fuel tank 12' causing the propellant to sublime and escape from the tan through the feed line 14'. The feet 80 on the propellant 76 are provided specifically to prevent entrapment of sublimed propellant, and to permit access of sublimed propellant to the propellant feed line 14'.

As herein before described, the thrustor body 16' may be of the type illustrated in FIG. 1. Accordingly, sublimed propellant, passing through the plug 17' is introduced to the thrustor body 16' and exited therefrom to produce the desired thrust.

The heated porous plug 17' operates as a mass flow regulator and a shutoff valve, and operates similarly to the porous plug particularly illustrated in the embodiment of FIG. 3. Accordingly, the porous plug 17' is heated by heating element 21' to insure sublimation of the propellant supplied through the propellant feed line 14'. In the environment, the plug 17' may be fabricated of relatively small mass and be selected of a material with a minimal heat capacity to operate quickly in response to the heating and shutoff electrical power to the heating element 21'. More particularly, when flow to the thrustor body is to be extinguished, power from the control unit 60' is shut off to the heating element 21'. The porous plug 17' thereby cools to an ambient temperature at which solidification of the propellant 76 occurs. Thus the sublimed propellant within the pores of the plug 17' will solidify and extinguish further passage of propellant through the feed line 14'. Additionally, the power control unit 92 extinguishes power to the Calrod heater 84 to prevent further sublimation of the propellant 76 within the tank 12'. However, since solidification of the propellant within the pores of the plug 17' occurs relatively rapidly, the residual heat from the Calrod heater 84 will continue sublimation of the propellant within the fuel tank 12'. Accordingly, the enlarged convex portions 94 and 96 of the tank 12' permit oversizing thereof in order to withstand a brief pressure rise due to propellant sublimation by the residual heat. Upon initiation of a desired thrust, heat is then supplied to the porous plug 17' causing the entrapped solidified propellant to vaporize relatively quickly, thereby achieving immediate thrust capability. Operation of the Calrod heater 84 also commences sublimation of the propellant within the fuel tank 12' in order to continue the desired thrust. Accordingly, in the embodiment of FIG. 4, removal of heat to the plug 17' achieves relatively fast valveless thrust termination as heretofore discussed in conjunction with the embodiment shown in FIG. 3.

The Calrod heater 84, together with the particular propellant configuration, provides uniform heating of the propellant surface, minimizing any shift in the center of mass as the propellant is expended. The porous plug 17' is externally heated and provides a valveless operation substantially decreasing the time required at turn-on and turnoff to obtain full thrust or zero thrust as required. Propellant in the pores of the plug solidify and vaporize quickly when the plug is fabrication from a small mass and is of a material with minimal heat capacity characteristics. The porous plug 17' eliminates totally the need for any moving fuel regulation parts in the propellant feed system and maximizes propellant fraction in the total volume available of the fuel tank 12. Accordingly, the porous plug illustrated in FIG. 4 operates similarly to the porous plug illustrated in FIG. 3 and may be used for either solid or liquid fuel systems to provide valveless flow regulation.

Other embodiments and attendant advantages of the invention will become apparent and are to be restricted only to those which are recited in the appended claims wherein:

What is claimed is:

1. A porous microthrustor comprising a source of propellant, a thrustor body having a propellant cavity therein receiving propellant from said source, a plug adjacent said propellant cavity and having a plurality of pores in communication with said propellant cavity,, an orifice plate maintaining said plug in position adjacent said propellant cavity and provided with an orifice communicating with said pores of said plug, heater means for elevating the temperature of said plug, and control means operatively connected to the heater means for varying the temperature of said plug within a range of temperatures, said pores of said plug varying in effective diameter in response to the temperature of said plug in order to regulate precisely the mass flow rate of the propellant through said orifice.

2. The structure as recited in claim 1 and further including insulating means surrounding said heater means and said thrustor body.

3. The structure as recited in claim 2, wherein said insulating means comprises ceramic foam insulation circumscribing said housing and wherein said heater means is embedded in said insulation, and an outer shell of layered metal foil.

4. The structure recited in claim 1 wherein said plug is fabricated from a material selected with catalytic activity properties capable of disassociating the propellant.

5. The structure recited in claim 1 wherein said plug is selected from a material of high heat capacity for storing heat energy and transferring the same to the propellant.